United States Patent [19]

Clerc

[11] Patent Number: 4,753,518
[45] Date of Patent: Jun. 28, 1988

[54] INTEGRATED CONTROL, ACTIVE MATRIX DISPLAY COMPRISING TWO GROUPS OF ROW ELECTRODES AND TWO GROUPS OF COLUMN ELECTRODES PER IMAGE POINT AND ITS CONTROL PROCESS

[75] Inventor: Jean-Frédéric Clerc, Saint Egreve, France

[73] Assignee: Commissariat a l'Energie Atomique, France

[21] Appl. No.: 860,652

[22] Filed: May 7, 1986

[30] Foreign Application Priority Data

May 7, 1985 [FR] France .................. 85 06935

[51] Int. Cl.$^4$ .......................... G02F 1/13; G09G 3/36
[52] U.S. Cl. .................................. 350/336; 350/332; 350/333; 350/334; 340/784
[58] Field of Search .............. 350/336, 334, 332, 333, 350/339 F; 357/23.7, 45; 340/784, 718, 719

[56] References Cited

U.S. PATENT DOCUMENTS

| | | | |
|---|---|---|---|
| 4,449,125 | 5/1984 | Clerc et al. ........................ | 350/333 |
| 4,541,690 | 9/1985 | Clerc .................................. | 350/333 |

FOREIGN PATENT DOCUMENTS

| | | |
|---|---|---|
| 0062289 | 3/1981 | European Pat. Off. . |
| 2530057 | 7/1983 | France . |

*Primary Examiner*—Stanley D. Miller
*Assistant Examiner*—Trong Quang Phan
*Attorney, Agent, or Firm*—Cesari and McKenna

[57] ABSTRACT

Integrated control, active matrix display means comprising two groups of row electrodes and two groups of column electrodes per image point and the control process for the same. This means comprises a display material inserted between two walls on the inner faces of which are arranged n parallel row conductors and two groups, each formed from m parallel columns, one of the two groups being raised to reference potential and each row conductor being connected to m switches, themselves connected to two conductor blocks of first and second groups facing column conductors of first and second groups. An image point is defined by the overlap zone of two column conductors and two conductor blocks respectively of a first and second groups.

8 Claims, 3 Drawing Sheets

INTEGRATED CONTROL, ACTIVE MATRIX DISPLAY COMPRISING TWO GROUPS OF ROW ELECTRODES AND TWO GROUPS OF COLUMN ELECTRODES PER IMAGE POINT AND ITS CONTROL PROCESS

BACKGROUND OF THE INVENTION

The present invention relates to an integrated control, active matrix display means comprising two groups of row electrodes and two groups of column electrodes per image point and the control process for the same.

The invention applies to the field of optoelectronics and mainly to the control of liquid crystal cells, used, more particularly as converters of electrical information into optical information, in the real time processing of optical images and for analogue display purposes.

More specifically, the invention relates to an integrated control, active matrix display comprising in per se known manner a display cell having two facing insulating walls, between which is placed a material having an optical property, such as opacity, a refractive index, transparency, absorption, diffusion, diffraction, convergence, etc. This material can be solid, liquid, amorphous or crystalline.

FIG. 1 diagrammatically shows a known active matrix display cell. FIG. 1 shows two insulating walls, namely a first wall 1 and a second wall 3, whereof at least one is transparent and which are facing one another, being maintained spaced and sealed by a joint 5. A layer of a material 7 having an optical property is placed between these walls.

Over the inner face of the second wall 3 is distributed a first group of n parallel row conductors $L_i$ and a second group of m parallel column conductors $K_j$, i and j being integers such that $1 \leq i \leq n$ and $1 \leq j \leq m$, the row conductors and column conductors crossing one another. Not shown display means outside the display cell make it possible to transmit signals appropriate for exciting material 7 to the row conductors and column conductors.

The term inner faces of wall 1 or wall 3 are understood to be the facing faces of said walls. At the intersection 11 of each row conductor $L_i$ and each column conductor $K_j$ there is a switch $R_{ij}$, such as a thin film transistor, connected to a conductor block $E_{ij}$.

Thus, with each image point $I'_{ij}$ corresponds a transistor $R_{ij}$ connected to a row conductor $L_i$ by the gate, to a column conductor $K_j$ by the source and to the corresponding conductor block $E_{ij}$ by the drain.

The conductor blocks $E_{ij}$ are made from a generally transparent conductive material, e.g. indium oxide, while the transistors are e.g. made from hydrogenated amorphous silicon.

The inner face of the first wall 1 is covered with a generally transparent conductive material serving as an opposite electrode 13.

Thus, an image point $I'_{ij}$ is defined by the overlap region of a conductor block $E_{ij}$ and the opposite electrode 13, the conductor block $E_{ij}$ and the opposite electrode forming the coatings of a capacitor between which is inserted a material layer 7.

In the particular case of the liquid crystal taken as an example throughout the remainder of the present text for clarity reasons, the excitation is of the electrical type. The opposite electrode 13 is raised to a given potential, whose value is periodically inverted to avoid deterioration of the liquid crystal. The row conductors and column conductors carry alternating voltages.

In order to select a particular image point $I'_{ij}$, an electric signal is supplied to row conductor $L_i$ and this selects the conductive or on state of the group of transistors connected to said row conductor and, in particular, the conductive or on state of transistor $R_{ij}$. When transistor $R_{ij}$ is in the on state, it transmits the electric signal from column $K_j$ to the corresponding conductor block $E_{ij}$. Thus, between block $E_{ij}$ and opposite electrode 13 there appears an electric field which will bring about a collective orientation of the molecules, particularly the liquid crystal between the coatings of the capacitor formed by conductor block $E_{ij}$ and opposite electrode 13. This collective orientation will modify the optical property of material 7.

By using the selective orientation of the molecules and the punctiform excitation of the liquid crystal, an image will be made to appear on the complete cell while defining same point by point.

In such display means, as a result of the intersections 11 of the row conductors $L_i$ and the column conductors $K_j$ on the inner face of wall 3, short-circuits occur between the row conductors and the column conductors, so that a complete row conductor and a complete column conductor is rendered inoperative during each short-circuit. In the same way, when a transistor $R_{ij}$ is short-circuited, it renders inoperative the complete row conductor and the complete column conductor to which it is connected.

Visually, isolated defective image points are accepted, but never a group of aligned defective image points corresponding to a complete row conductor or a complete column conductor.

No. FR-A-2 553 218 describes an active matrix display obviating intersections of row conductors and column conductors on the inner face of a wall of the display means. For this purpose, the opposite electrode of the first wall of the aforementioned means is replaced by parallel column conductors with which are associated conductor blocks arranged in matrix-like manner. Moreover, on the inner face of the second wall is also arranged a matrix of conductor blocks facing the first matrix, said conductor blocks being connected to row conductors by switches, such as transistors. Thus, an image point is defined by the overlap zone of two facing conductor blocks.

Such display means make it possible to obviate short-circuits between a row conductor and a column conductor, but a short-circuited transistor can still render inoperative a complete row conductor and therefore a row of image points.

SUMMARY OF THE INVENTION

The invention aims at obviating these disadvantages and more particularly at providing an integrated control, active matrix display means making it possible to obviate any intersection between the row conductors and the column conductors on the inner face of a wall of the display means and ensures that a short-circuited transistor does not render inoperative a complete row conductor and a complete column conductor.

More specifically the present invention relates to an integrated control, active matrix display comprising an electrooptical material having an optical property, inserted between a first insulating wall and a second insulating wall, whereof at least one is transparent, which are kept spaced from one another, wherein the inner face of the second wall is covered by n parallel row conductors, each row conductor being connected to m switches, each connected to a conductor block of a first group and to a conductor block of a second group, said blocks being juxtaposed with said row conductor and wherein the inner face of the first wall is covered by a first group of m parallel column conductors and a second group of m parallel column conductors, each column conductor of the second group being located between two column conductors of the first group, the column conductors of the first and second groups intersecting the row conductors, each column conductor of the first group facing n conductor blocks of the first group and each column conductor of the second group facing n conductor blocks of the second group, one of the two blocks of column conductors being raised to a reference potential, an image point being defined by the overlap zone of two column conductors, respectively of the first and second groups with two conductor blocks, respectively of the first and second groups connected by a switch to a row conductor, said conductors carrying appropriate signals bringing about an excitation of the material.

According to an embodiment, the material is a liquid crystal layer, whose optical property is dependent on the electric field applied thereto.

According to another embodiment, the switch is a thin film transistor, whereof the gate is connected to a row conductor, whereof the source is connected to one of the two conductor blocks corresponding to an image point and whereof the drain is connected to the other conductor block of said image point.

According to another embodiment, the column conductors and/or the conductor blocks are made from a transparent conductive material. At least one of the two groups of elements constituted by the column conductors and the conductor blocks is transparent and in particular that associated with the transparent wall facing an observer.

According to a preferred embodiment, the transparent conductive material is indium oxide.

The present invention also relates to a control process for a matrix display means incorporating an electrooptical material having an optical property, inserted between a first insulating wall and a second insulating wall, at least one of which is transparent and which are kept spaced from one another, the inner face of the second wall being covered by n parallel row conductors, each row conductor being connected to m switches, each connected to a conductor block of a first group and to a conductor block of a second group, said blocks being juxtaposed with said row conductor, the inner face of the first wall being covered by a first group of m parallel column conductors and a second group of m parallel column conductors, each column conductor of the second group being between two column conductors of the first group, the column conductors intersecting with the row conductors, each column conductor of the first group facing n conductor blocks of the first group and each column conductor of the second group facing n conductor blocks of the second group, one of the two groups of column conductors being raised to a reference potential, an image point being defined by the overlap zone of two column conductors, respectively of the first and seconds groups with two conductor blocks, respectively of the first and second groups connected by a switch to a row conductor, said conductors carrying appropriate signals bringing about an excitation of the material, wherein for controlling the optical property of the material at image point $I_{ij}$, with i and j being integers such that $1 \leq i \leq n$ and $1 \leq j \leq m$, to the row conductor $N_i$ is applied a potential $V_{Gi}$ and to the column conductors $M_j$ and $M'_j$ of the first and second groups the potentials $V_R$ and $V_{Fj}$ with $V_{Gi} > V_R$, $V_{Gi} > V_{Fj}$ and $V_{Fj} \neq V_R$ for a row time $T_L = T/n$, T being the addressing period of an image point and with $V_{Gi} < V_R$ and $V_{Gi} < V_{Fj}$, outside said row time $T_L$ and during said row time $T_L$ to the other row conductors is applied a potential $V_{Gs}$ and to the other column conductors the potentials $V_R$ and $V_{FK}$, such that $V_{Gs} < V_R$, $V_{Gs} < V_{Fk}$ and $V_{Gs} < V_{Gi}$.

According to an embodiment of the process, the switches being transistors, a potential $V_{Gi}$, such that $V_{Gi} > V_R$ and $V_{Gi} > V_{Fj}$, selects the on state of the transistor associated with the image point $I_{ij}$.

According to another embodiment of the process, when selecting an image point, the potential difference between the conductor block of the first group and the column conductor of the first group and between the conductor block of the second group and the column conductor of the second group corresponding to said image point is equal to $(V_{Fj} - V_R)/2$.

BRIEF DESCRIPTION OF THE DRAWINGS

The invention is described in greater detail herein after relative to non-limitative embodiments and with reference to the attached drawings, wherein show.

DETAILED DESCRIPTION OF THE PREFERRED EMBODIMENTS

Figure 1:
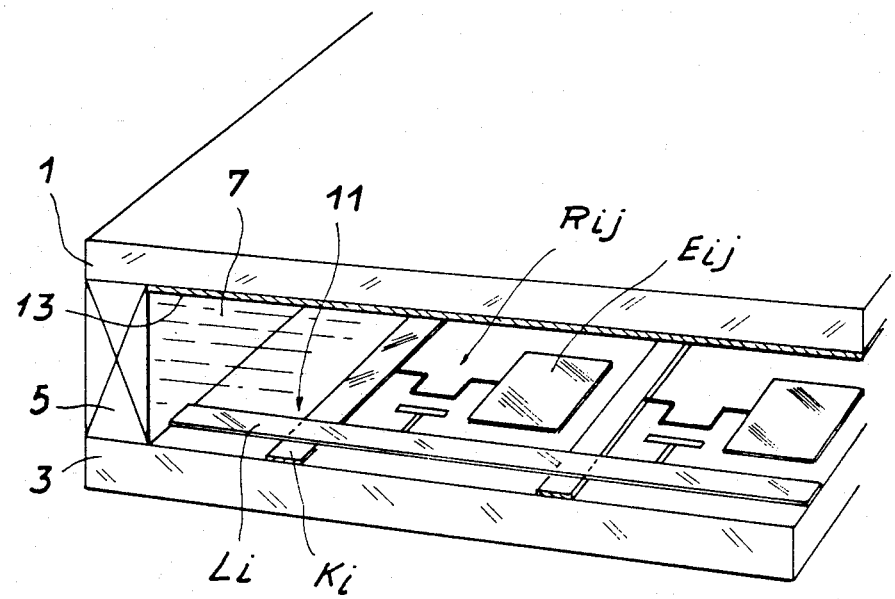
FIG. 1, already described, diagrammatically and in perspective a known display cell.
Figure 2A:
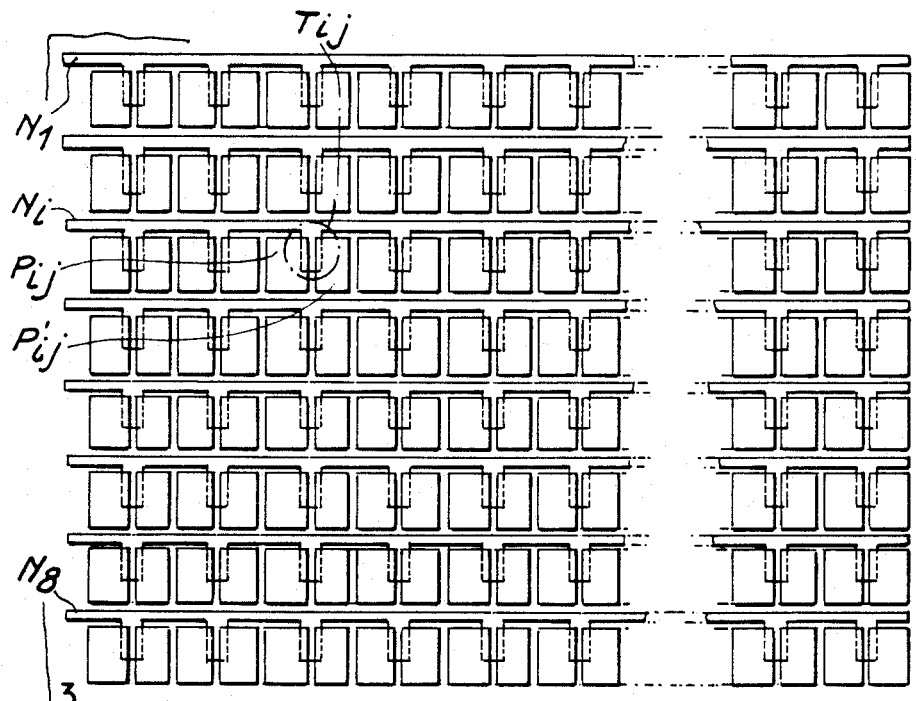
FIGS. 2a and 2b, diagrammatically the inner faces respectively of the second wall and the first wall of an embodiment of the display means according to the invention.
Figure 2B:
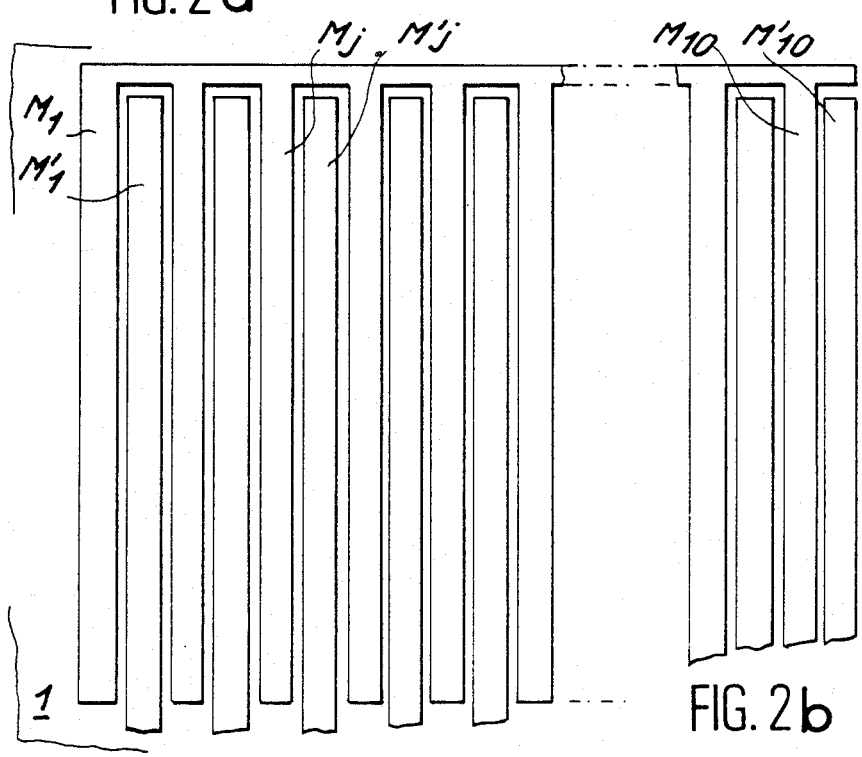

FIGS. 2a and 2b respectively show the two inner faces of the second and first walls of a display means according to the invention.

FIG. 2a shows n row conductors $N_i$, which are parallel and located on the inner face of the second wall 3 of the display cell, with i being an integer such that $1 \leq i \leq n$. Each row conductor $N_i$ is connected to m switches $T_{ij}$, such as thin film transistors with i and j being integers such that $1 \leq i \leq n$ and $1 \leq j \leq m$. The remainder of the text will refer to the particular example of transistors. Each transistor $T_{ij}$ is connected by its gate to a row conductor $N_i$ and by its source and drain in random manner to a conductor block $P_{ij}$ of a first group and to a conductor block $P'_{ij}$ of a second group. These conductor blocks $P_{ij}$ and $P'_{ij}$ of the first and second groups constitute the two groups of row electrodes per image point of the display means according to the invention. The conductor blocks of the first and second groups are usually made from a transparent conductive material, such as indium oxide. The row conductors $N_i$ carry electric signals making it possible to select either the on or conductive state, or the off or non-conductive state of the transistors connected thereto.

In the case of FIG. 2a are shown 8 row conductors, each row conductor $N_i$ being connected by 10 transistors to 10 series of two conductor blocks of the first and second groups.

FIG. 2b shows the inner face of the first wall 1 of the display. On said face are arranged a first group of m parallel column conductors, raised to a reference potential $V_R$ and a second group of m parallel, independent column conductors $m'_j$, each column conductor of the second group being located between two column conductors of the first group, with j being an integer such that $1 \leq j \leq m$. These two groups of column conductors constitute the two groups of column electrodes of the display according to the invention. The column conductors of the first and second groups are made from a generally transparent conductive material, such as indium oxide. The m column conductors $m'_j$ of the second group carry electric signals making it possible to excite the material, particularly the liquid crystal placed between walls 1 and 3. In the present case, column conductors of the first group are shown, which are interconnected and raised to a reference potential $V_R$ and the independent column conductors of the second group, but the reverse could equally well have been the case.

When walls 1 and 3 face one another, the two groups of m column conductors $M_j$ and $M'_j$ intersect with respect to the row conductors $N_{ij}$, each column conductor of a group facing n conductor blocks of the same group respectively connected to n row conductors. Thus, the first group of m column conductors $M_j$ faces the m.n conductor blocks $P_{ij}$ of the first group and the second group of m column conductors $M'_j$ faces the m.n conductor blocks $P'_{ij}$ of the second group.

In the example of FIG. 2b is shown a first and second groups of 10 column conductors. With the arrangement chosen in FIGS. 2a and 2b, when walls 1 and 3 face one another, a column conductor $M_j$ of the first group will face 8 conductor blocks $P_{1j}, P_{2j} \ldots P_{8j}$ of the first group connected to the 8 row conductors $N_1 \ldots N_8$ by 8 transistors $T_{1j}, T_{2j} \ldots T_{8j}$ and a column conductor $M'_j$ of the second group will face 6 conductor blocks $P'_{1j}, P'_{2j} \ldots P'_{8j}$ of the second group connected to the 8 conductor blocks referred to hereinbefore and to the 8 row conductors $N_1 \ldots N_8$ by the 8 transistors $T_{1j} \ldots T_{8j}$.

An elementary image $I_{ij}$ of a display means according to the invention is consequently defined by the overlap zone between the column conductors $M_j$ and $M'_j$ of the first and second groups with the conductor blocks $P_{ij}$ and $P'_{ij}$ of the first and second groups, said conductor blocks being connected to the row conductor $N_i$ by a transistor $T_{ij}$, with i and j being integers such that $1 \leq i \leq n$ and $1 \leq j \leq m$.

Figure 3A:
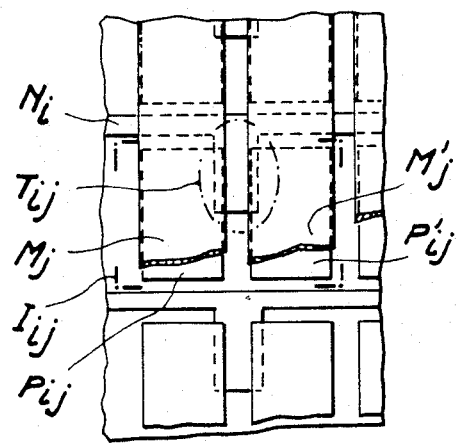
FIGS. 3a and 3b, diagrammatically an elementary image point of a display means according to the invention and the equivalent circuit diagram.
Figure 3B:
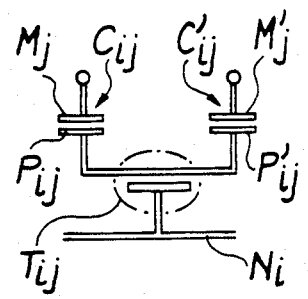

FIGS. 3a and 3b provide a better understanding of the operation of a display means according to the invention taking the particular case of an elementary image point $I_{ij}$.

FIG. 3a shows a transistor $T_{ij}$ connected by its gate to a row conductor $N_i$ and by either its source or drain to the conductor blocks $P_{ij}$ and $P'_{ij}$ of the first and second groups, a column conductor $M_j$ of the first group being superimposed on the conductor block $P_{ij}$ and a column conductor $M'_j$ of the second group being superimposed on conductor block $P'_{ij}$.

The column conductors $M_j$ and $M'_j$ and the conductor blocks $P_{ij}$ and $P'_{ij}$, respectively, for the first and second coatings of two capacitors $C_{ij}$ and $C'_{ij}$, whereof the material, inserted between these coatings and in particular liquid crystal molecules, forms the dielectric. The first coating of capacitor $C_{ij}$ corresponding to column conductor $N_j$ is consequently raised to a reference potential $V_R$, while the first coating of capacitor $C'_{ij}$ is raised to the potential $V_{Fj}$ of the column conductor $M'_j$ associated therewith.

FIG. 3b shows the equivalent circuit diagram to the diagram of FIG. 3a. FIG. 3b again shows the row conductor $N_i$ associated with transistor $T_i$, the conductor blocks $P_{ij}$ and $P'_{ij}$ connected either to the source or drain of $T_{ij}$ and the column conductors $M_j$ and $M'_j$.

The conductor blocks $P_{ij}$ and $P'_{ij}$ respectively form with the column conductors $M_j$ and $M'_j$ facing the same, the capacitors $C_{ij}$ and $C'_{ij}$. The first coatings of these capacitors $C_{ij}$ and $C'_{ij}$ are respectively, raised to a reference potential $V_R$ and to a potential $V_{Fj}$ dependent on the information to be displayed.

Thus, for controlling the display of an image point $I_{ij}$, row $N_i$ is selected for a row time $T_L$ equal to the addressing period T divided by the number of rows n of the means. The on state of transistor $T_{ij}$ associated with said point is obtained by supplying an electric signal $V_{Gi}$ to row $N_i$, so that $V_{Gi} > V_R$ and $V_{Gi} > V_{Fj}$. Due to the on state of transistor $T_{ij}$, between the two capacitors $C_{ij}$ and $C'_{ij}$ there is a charge exchange for the duration of the row time $T_L$, which tends to establish an equilibrium. Between the second coatings respectively the first coatings of capacitors $C_{ij}$ and $C'_{ij}$, the same electric charge then exists, but it has the opposite sign. The potential difference between the respective coatings of capacitor $C_{ij}$ and $C'_{ij}$ is equal to $(V_{Fj} - V_R)/2$. This potential difference is not zero when $V_{Fj} \neq V_R$, it then producing an electric field between the coatings, which will bring about a collective orientation of the liquid crystal molecules located between said coatings and will therefore modify the optical characteristic thereof. Thus, the image point $I_{ij}$ will be illuminated.

If, for example, at the start of the row time $T_L$ for the selection of row $N_i$ corresponding to the on state of transistor $T_{ij}$, there is $V_R = 0$ and $V_{Fj} = 10$ volts, at the end of the row time $T_L$, there will be a potential difference respectively between the coatings of capacitor $C_{ij}$ and $C'_{ij}$ of 5 volts.

Outside said row time $T_L$ for the selection of a row $N_i$, i.e. during the (n−1) other row times $T_L$ of the addressing time T, the electric signal $V_{Gi}$ applied to row $N_i$ is such that $V_{Gi} < V_R$ and $V_{Gi} < V_{Fj}$, so that transistor $T_{ij}$ is then off. Between the two capacitors $C_{ij}$ and $C'_{ij}$, it can be considered that there is an infinite resistance and therefore no charge exchange between said capacitors.

The charges initially present on the coatings of capacitors $C_{ij}$ and $C'_{ij}$ are retained, except for the charge leaks. The potential difference between the coatings of capacitors $C_{ij}$ and $C'_{ij}$ consequently differs very little from $(V_{Fj} - V_R)/2$. If the corresponding image point $I_{ij}$ where illuminated, it would remain illuminated. For selecting a row $N_i$, the electric signal $V_{Gi}$ carried by said row is consequently such that $V_{Gi} > V_R$ and $V_{Gi} > V_{Fi}$, no matter what $V_R$ and $V_{Fj}$.

When a row $N_i$ is selected, i.e. during the row time $T_L$, all the transistors associated with said row $N_i$ are consequently in the on state. So as not to modify the optical characteristic of the material at image points $I_{ik}$ with k an integer, so that $1 \leq k \leq m$ and $k \neq j$, a potential $V_{Fk}$, so that $V_{Fk} = V_R$ is supplied on each column conductor $M'_k$.

As stated hereinbefore, due to the fact that the transistors of row $N_i$ are in the on state, an equilibrium is established between capacitors $C_{ik}$ and $C'_{ik}$, but due to the fact that $V_{Fk}$ is equal to $V_R$, the potential difference at the terminals of the coatings of capacitors $C_{ik}$ and $C'_{ik}$ is equal to $(V_{Fk}-V_R)/2=0$. The image points $I_{ik}$ will consequently be extinguished.

Outside the time $T_L$ for the selection of a row, i.e. during the (n−1) following row times $T_L$, the transistors of row $N_i$ are off, so that there is no charge exchange between the capacitors $C_{ik}$ and $C'_{ik}$, the charges on either side of the coatings being zero and the potential difference between the coatings also being zero.

All the image points associated with a row $N_i$ differing from the image point $I_{ij}$ consequently remain extinguished during the n row times corresponding to the addressing time T.

During the control of the display of an image point $I_{ij}$, during the row time $T_L$ for the selection of a row $N_i$, to the other row conductors is applied a potential $V_{Gs}$ and to the other column conductors is applied the potentials $V_R$ and $V_{Fk}$, so that $V_{Gs}<V_R$, $V_{Gs}<V_{Fk}$ and $V_{Gs}<V_{Gi}$, in order that the transistors associated with said other row conductors are blocked or off during said row time $T_L$.

The same procedure is adopted for controlling the display of each image point of the display means. Thus, there is a point by point display of an image on the complete display means according to the invention using a sequential addressing mode.

Figure 4:
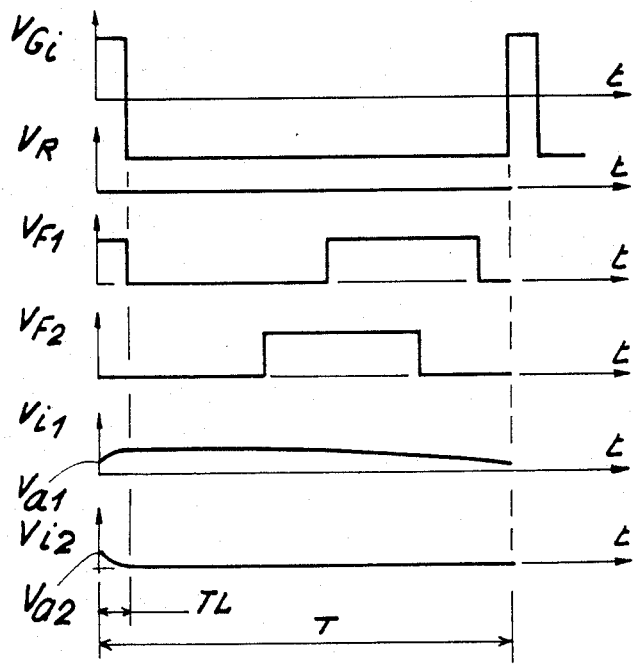
FIG. 4, a timing diagram of examples of control signals applied to row and column conductors of a display according to the invention, as well as the resulting signals at the corresponding image points.

FIG. 4 shows a timing diagram of examples of electric signals $V_{Gi}$, $V_R$, $V_{F1}$, $V_{F2}$ respectively applied to a row $N_i$, to all the m column conductors $M_1 \ldots M_m$ of the first group, to the column conductor $M'_2$ of the second group and to the column conductor $M'_2$ of the second group, as well as the resulting electric signals $V_{i1}$ and $V_{i2}$ corresponding to the potential difference respectively between the coating of capacitor $C_{i1}$, $C'_{i1}$ and $C_{i2}$, $C'_{i2}$ of the image points $I_{i1}$ and $I_{i2}$.

Signal $V_{Gi}$ is periodic of period T, $V_{Gi}$ is positive during a row time $T_L$ equal to the addressing period T divided by the number of rows n of the display means. Period T is generally approximately 20 ms. Row $N_i$ is selected whenever signal $V_{Gi}$ is positive, the other rows of the display means being selected at separate row times $T_L$ distributed over time T. Signal $V_R$ applied to all the column conductors of the first group $M_1, M_2 \ldots M_m$ is constant and zero.

However, the signals $V_{F1}$ and $V_{F2}$ applied respectively to the column conductors $M'_1$ and $M'_2$ of the second group are pulse-type, being dependent on the desired display, so that they are either positive or zero. Thus, when row $N_i$ is selected, i.e. when $V_{Gi}$ is positive, we obtain $V_{Gi}>V_R$, $V_{Gi}>V_{F1}$ and $V_{Gi}>V_{F2}$, transistors $T_{i1}$ and $T_{i2}$ being in the on state.

Signal $V_{F1}$ is not zero during the selection time $T_L$ of row $N_i$, so that there is a charge exchange between the capacitor $C_{i1}$ and $C'_{i1}$ corresponding to the image point $I_{i1}$. The resulting signal $V_{i1}$ between the coatings of capacitor $C_{i1}$ and $C'_{i1}$ will consequently lead to potential $(V_{F1}-V_R)/2=V_{F1}/2$, as from an initial state $V_{a1}$.

Following the selection time $T_L$ of row $N_i$, with transistor $T_{i1}$ being off, there will be no charge exchanged between capacitor $C_{i1}$ and $C'_{i1}$, whatever the signal $V_{F1}$ applied to the column $M'_1$. The potential difference between the coatings of capacitors $C_{i1}$ and $C'_{i1}$ will remain equal to $V_{F1}/2$, except for the charge leaks.

Thus, signal $V_{i1}$ will slowly decrease over the remainder of the addressing time T.

However, as signal $V_{F2}$ is zero throughout the selection time $T_L$ of row $N_i$, the voltage at the terminals of the coatings of capacitors $C_{i2}$ and $C'_{i2}$ is equal to $(V_{F2}-V_R)/2=0$. The signal $V_{i2}$ corresponding to the image point $I_{i2}$ will consequently be cancelled out as from an initial state $V_{a2}$, signal $V_{i2}$ remaining zero outside the selection time of row $N_i$ over the remainder of the addressing time T.

Thus, the potential difference seen by the liquid crystal between the coatings of capacitors $C_{ij}$ and $C'_{ij}$ will depend on the signal $V_{Fj}$ applied to the column conductor $M'_j$. By varying the voltage level of signal $V_{Fj}$, it is consequently possible to obtain intermediate states between a black and white display, respectively corresponding to an illuminated or extinguished state of the image points.

With the display means according to the invention, it is consequently possible to obviate the short-circuiting of complete row and columns. The possible defects present in the display means will only affect isolated image points. Moreover, the separation of the row conductors and the column conductors, which are, respectively, placed on the inner faces of the second and first walls of the display means leads to a better manufacturing efficiency.

What is claimed is:

1. An integrated control, active matrix display comprising an electrooptical material having an optical property, inserted between a first insulating wall and a second insulating wall, whereof at least one wall is transparent, which are kept spaced from one another, wherein the inner face of the second wall is covered by n parallel row conductors, each row conductor being connected to m switches, each connected to a conductor block of a first group and to a conductor block of a second group, said blocks being juxtaposed with said row conductor and wherein the inner face of the first wall is covered by a first group of m parallel column conductors and a second group of m parallel column conductors, each column conductor of the second group being located between two column conductors of the first group, the column conductors of the first and second groups intersecting the row conductors, each column conductor of the first group facing n conductor blocks of the first group and each column conductor of the second group facing n conductor blocks of the second group, one of the two blocks of column conductors being raised to a reference potential, an image point being defined by the overlap zone of two column conductors, respectively of the first and second groups with two conductor blocks, respectively of the first and second groups connected by a switch to a row conductor, said conductors carrying appropriate signals bringing about an excitation of the material.

2. A display means according to claim 1, wherein the material is a liquid crystal layer, whose optical property is dependent on the electric field applied thereto.

3. A display means according to claim 1, wherein the switch $T_{ij}$ is a thin film transistor, whereof the gate is connected to a row conductor $N_i$, whereof the source is connected to one of the two conductor blocks $P_{ij}$, $P'_{ij}$ corresponding to an image point $I_{ij}$ and whereof the drain is connected to the other conductor block $P'_{ij}$, $P_{ij}$ of said image point.

4. A display means according to claim 1, wherein the column conductors $M_j$, $M'_j$ and/or the conductor blocks $P_{ij}$, $P'_{ij}$ are made from a transparent conductive material.

5. A display means according to claim 4, wherein the transparent conductive material is indium oxide.

6. A control process for a matrix display means incorporating an electrooptical material having an optical property, inserted between a first insulating wall and a second insulating wall, at least one of which wall is transparent and which are kept spaced from one another, the inner face of the second wall being covered by n parallel row conductors, each row conductor being connected to m switches, each connected to a conductor block of a first group and to a conductor block of a second group, said blocks being juxtaposed with said row conductor, the inner face of the first wall being covered by a first group of m parallel column conductors and a second group of m parallel column conductors, each column conductor of the second group being between two column conductors of the first group, the column conductors intersecting with the row conductors, each column conductor of the first group facing n conductor blocks of the first group and each column conductor of the second group facing n conductor blocks of the second group, one of the two groups of column conductors being raised to a reference potential, an image point being defined by the overlap zone of two column conductors, respectively of the first and seconds groups with two conductor blocks, respectively of the first and second groups connected by a switch to a row conductor, said conductors carrying appropriate signals bringing about an excitation of the material, wherein for controlling the optical property of the material at image point $I_{ij}$, with i and j being integers such that $1>i>n$ and $1>j>m$, to the row conductor $N_i$ is applied a potential $V_{Gi}$ and to the column conductors $M_j$ and $M'_j$ of the first and second groups the potentials $V_R$ and $V_{Fj}$ with $V_{Gi}>V_R$, $V_{Gi}>V_{Fj}$ and $V_{Fj} \neq V_R$ for a row time $T_L = T/n$, T being the addressing period of an image point and with $V_{Gi}<V_R$ and $V_{Gi}<V_{Fj}$, outside said row time $T_L$ and during said row time $T_L$ to the other row conductors is applied a potential $V_{Gs}$ and to the other column conductors the potentials $V_R$ and $V_{Fk}$, such that $V_{Gs}<V_R$, $V_{Gs}<V_{Fk}$ and $V_{Gs}<V_{Gi}$.

7. A control process according to claim 6, wherein with the switches being transistors, a potential $V_{Gi}$, so that $V_{Gi}>V_R$ and $V_{Gi}>V_{Fj}$, selects the on state of transistor $T_{ij}$ associated with the image point $I_{ij}$.

8. A control process according to claim 6, wherein on selecting an image point $I_{ij}$, the potential difference between the conductor block $P_{ij}$ of the first group and the column conductor $M_j$ of the first group and between the conductor block $P'_{ij}$ of the second group and the column conductor $M'_j$ of the second group corresponding to said image point is equal to $(V_{Fj}-V_R)/2$.

* * * * *